United States Patent [19]

Wettlaufer

[11] Patent Number: 5,267,509
[45] Date of Patent: Dec. 7, 1993

[54] FILTER BAG ASSEMBLY

[76] Inventor: Dale E. Wettlaufer, 842 Oakwood Ave., East Aurora, N.Y. 14052

[21] Appl. No.: 889,129

[22] Filed: May 26, 1992

[51] Int. Cl.$^5$ .................................................. B30B 9/06
[52] U.S. Cl. ..................................... 100/114; 100/115; 100/123; 100/198; 100/199
[58] Field of Search ............................ 100/113–115, 100/122, 123, 194–200, 202; 210/225, 407, 470, 489, 499

[56] References Cited

U.S. PATENT DOCUMENTS

| | | | |
|---|---|---|---|
| 260,542 | 7/1882 | Dannecker | 100/122 |
| 603,323 | 5/1898 | Eckart | 210/489 X |
| 626,646 | 6/1899 | Baggett . | |
| 729,807 | 6/1903 | Stoveken et al. . | |
| 1,065,335 | 6/1913 | Barton et al. | 210/499 X |
| 1,130,701 | 3/1915 | Berrigan | 100/122 X |
| 1,410,301 | 3/1922 | Hauf | 100/123 X |
| 2,022,679 | 12/1935 | Leo | 100/123 X |
| 2,346,375 | 4/1944 | Harris . | |
| 3,289,844 | 12/1966 | Emele . | |
| 4,219,425 | 8/1980 | Yoshida . | |
| 4,448,686 | 5/1984 | Friedman . | |
| 4,680,808 | 7/1987 | Paleschuck | 100/122 X |
| 4,892,665 | 1/1990 | Wettlaufer | 100/198 X |
| 4,900,436 | 2/1990 | Iwatani . | |
| 5,045,186 | 9/1991 | Takashima . | |

FOREIGN PATENT DOCUMENTS

83/01268  4/1983  PCT Int'l Appl. ................. 210/499

Primary Examiner—Stephen F. Gerrity
Attorney, Agent, or Firm—John C. Thompson

[57] ABSTRACT

A novel filter bag assembly (10) which may be used in a press (12) for squeezing juice from fruit. The bag assembly facilitates the discharge of a press cake (PC) from within the bag when it is inverted. The bag assembly includes a bag (50) and an inner liner made from a plurality of flaps (64, 65, 66), there being at least two flaps on each of the wide sides (58, 60) of the bag, the flaps being arranged in a tiered fashion so that the lower edge of one flap will overlie the top edge of an adjacent flap. The bag assembly is utilized with a press having a plurality of press racks or plates (14) which are mounted for movement towards and away from each other and also for movement from an upright normal position to an inverted position, each rack carrying first mounting structure (68) on the top edge (14.1) of the rack, the bag assemblies being provided with second mounting structure which cooperate with the first mounting structure so that the bag assemblies may be supported by and between adjacent racks. First retaining structure (76) is carried by the bottom edges (14.3) of the press racks, and second retaining structure (80) is carried by the bottom (52) of the bags, the retaining structures engaging each other so that when the racks are inverted the bottom of the bag will not drop permitting the press cake within the bag to peel away from the liner and drop from the bag.

19 Claims, 4 Drawing Sheets

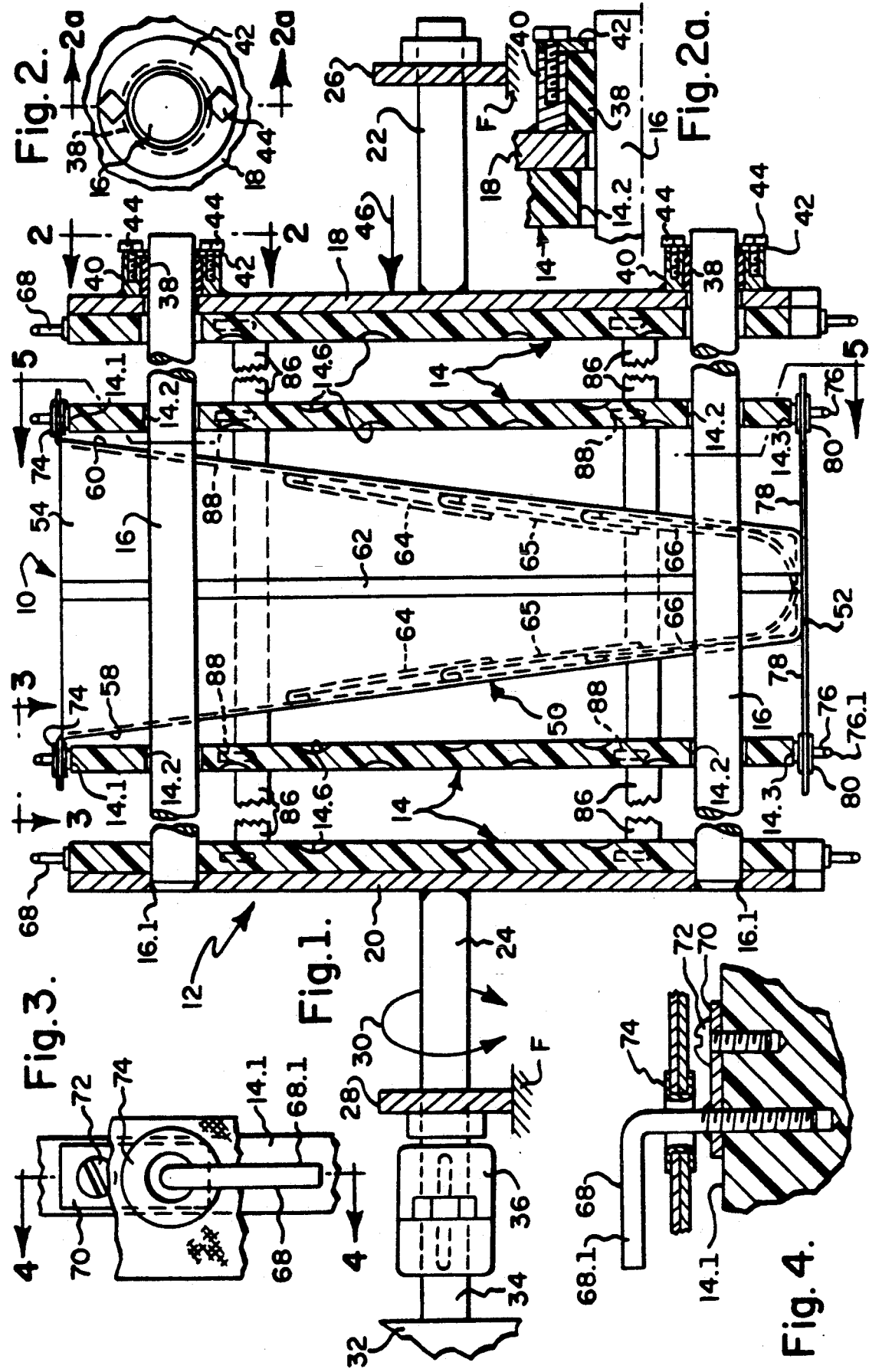

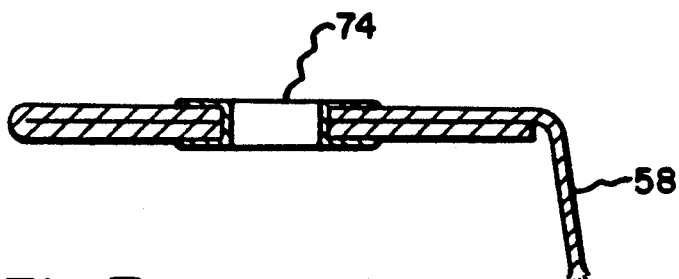
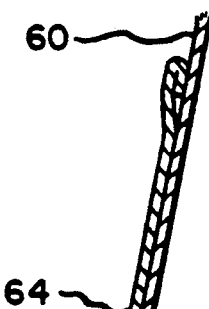
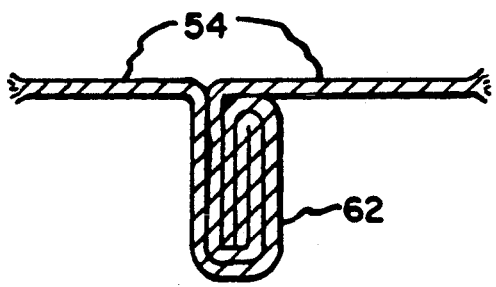
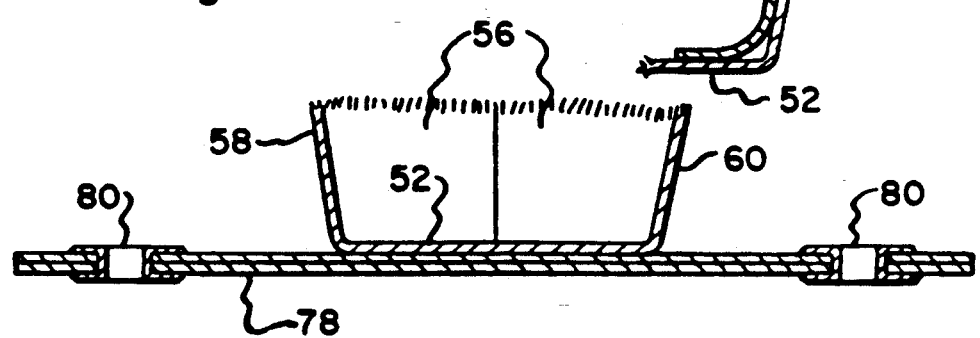

FILTER BAG ASSEMBLY

TECHNICAL FIELD

The present invention relates generally to filters or the like which are used for filtering juice from fruit, and more particularly to a novel filter bag assembly which may be used in a filtering apparatus, and also to a novel filter press which may be used with the novel filter bag assembly of this invention.

BACKGROUND OF THE INVENTION

It is well known in the art to employ a press for squeezing juice from fruit or the like. One such press is shown in U.S. Pat. No. 4,892,665 to the present inventor. This patent shows a plurality of press plates or racks which have filter bags disposed between them. In operation the bags are suitably filled with the fruit which is to be pressed, and the press plates or racks are moved together to squeeze the juice from the fruit. At the completion of the pressing operation the press racks and the bags are turned upside down and the pomace or press cake is then removed from the bags. Invariably the press cake sticks to one side or the other of the filter bag. While ideally the press cake (or pomace) should fall from the bags when they are shaken, this frequently doesn't occur. This then requires the press operator to insert a paddle-like instrument between the press cake and the side of the filter bag to which the press cake is sticking to free the press cake from the bag. As this is a time consuming operation it reduces the potential through-put of the machine.

In other presses differing designs have been utilized for facilitating the removal of the press cake from the press. One such design is shown in U.S. Pat. No. 3,289,844 to Emele which discloses a sinusoidal web have filter portions disposed between the press racks. The filter portions will be caused to be shifted out of the plane of the press cake when the press is opened to dislodge the press cake.

U.S. Pat. No. 5,045,182 to Takashima discloses a plural filter press employing vertical filter cloths which may be vibrated to dislodge the press cake.

Another design is shown in U.S. Pat. No. 4,900,436 to Iwatani who discloses jolting means for dislodging the press cake from a filter press.

While all of the above press devices are well known in the art, it is still desirable to provide an improved filter bag design which will provide a means for facilitating the removal of the press cake from the filter bag upon the completion of the filtering operation and which, when used in a filter press, will facilitate the pressing of juice from the pulp which forms a press cake.

OBJECTS AND FEATURES OF THE INVENTION

It is an object of the present invention to provide a an improved filter bag assembly which will facilitate the discharge of a press cake when inverted, as well as a novel apparatus for pressing juice from fruit or the like, the novel apparatus including an improved filter bag assembly.

More particularly, it is an object of the present invention to provide a novel filter bag assembly having a bag and an inner liner, preferably in the form of opposed flaps, the bag and the liner being made of suitable filter materials, the inner liner (or flaps) only being secured at the upper edge so that when the bag assembly is inverted and the bottom of the bag is held from falling, any press cake within the bag assembly may peel away from the liner of the bag under the influence of gravity until the press cake drops from the bag and the liner attains an upside down position. By employing this design it is not necessary for the operator to insert a paddle-like object between the press cake and that side of the bag to which the press cake adheres in order to dislodge the press cake.

In the preferred embodiment of this invention the liner is made from a plurality of flaps, there being at least two flaps on each of the wide sides of the bag, the flaps being arranged in a tiered fashion so that the lower edge of one flap will overlie the top edge of an adjacent flap.

According to a feature of this invention the upper flap is so arranged that, when the bag assembly is inverted and the bottom of the bag is held from falling, the lower edge of the top flap will not extend an appreciable distance below the top edge of the bag so that when the bag is moved back to its normal upright position the flaps will fall back into the bag without draping over the upper edges of the sides of the bag.

It is a further feature of the present invention that the flaps may be made of a differing material than the bottom and sides of the bag so that more desirable materials may be utilized. Accordingly, the bag may be made of a strong filter material which may withstand tension forces applied to the bag when used in a filter press during the opening of the press and during the squeezing operation, as well as at other times, and the flaps may be made of another suitable filter material which is not as strong as the material used in the bag.

It is another feature of this invention that the bag is utilized with a filter press having a plurality of press racks or plates which are mounted for movement towards and away from each other and also for movement from an upright normal position to an inverted position, each rack carrying first mounting means on the top edge of the rack, the filter bag assemblies in turn being provided with second mounting means which cooperate with the first mounting means on the top of the racks so that the bag assemblies may be supported by and between adjacent racks.

It is yet another feature of this invention to provide, within the structure set forth above, first retaining means carried by the bottom edges of the press racks, there being second retaining means carried by the bottom of the bags which engage the first retaining means so that when the racks are inverted the bottom of the bag will not drop permitting the press cake within the bag to peel away from the liner and drop from the bag.

The foregoing will be more fully understood after a consideration of the following detailed description taken in conjunction with the accompanying drawings in which a preferred form of this invention is illustrated.

BRIEF DESCRIPTION OF THE DRAWINGS

FIG. 1 is a somewhat schematic sectional view through a portion of a juice press or the like in which the filter bag assembly of this invention is incorporated.

FIG. 2 is a sectional view taken generally along the line 2—2 in FIG. 1.

FIG. 2a is an enlarged sectional view taken generally along the line 2a—2a in FIG. 2.

FIG. 3 is a top view taken generally along the line 3—3 in FIG. 1.

FIG. 4 is a sectional view taken generally along the line 4—4 in FIG. 3.

FIGS. 7, 7a, 8 and 9 are sectional views taken generally along the lines 7—7, 7a—7a, 8—8 and 9—9 in FIG. 6, respectively.

FIG. 10 shows the bag initially filled before a pressing operation. FIG. 11 shows the bag assembly at the completion of the pressing operation. FIG. 12 shows the bag assembly after it has been opened up and before inversion of the bag assembly. FIGS. 13 and 14 show how the press cake will be pulled out of the bag assembly by gravity after the open filter bag assembly has been inverted. Finally, FIG. 15 shows an empty inverted filter bag assembly, the press cake having fallen from the bag assembly.

DETAILED DESCRIPTION

Figure 5:
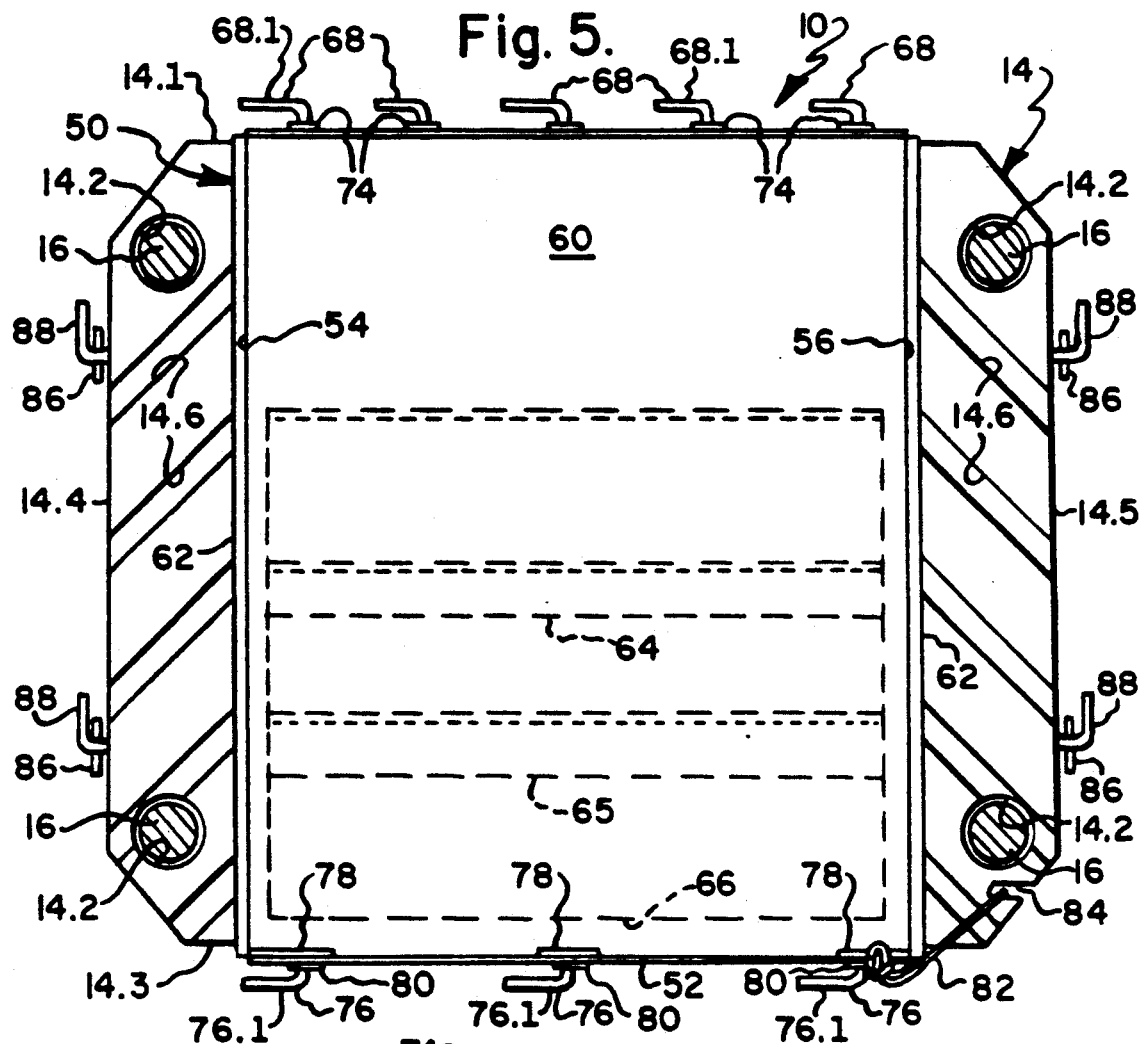
FIG. 5 is a sectional view taken generally along the line 5—5 in FIG. 1.

With reference first to FIG. 1, the filter bag assembly of this invention, which is indicated generally at 10, is shown in combination with a juice press or the like, which juice press is indicated generally at 12. While the juice press per se does not form part of the present invention, it should be noted that it includes a plurality of press plates or racks 14. Each of the press racks 14 (which in the preferred embodiment are formed from a plate of plastic material) includes a top edge 14.1, four apertures 14.2 at the corners of the rack, a bottom edge 14.3, and first and second sides 14.4 and 14.5, respectively, these sides also being referred to as "one" side and "the other" side, respectively. The faces of the racks are suitably grooved, as at 14.6, to provide channels for the flow of juice. The press racks are supported on four horizontally extending support or guide rods 16 for sliding movement, the rods passing through the apertures 14.2 at the four corners of each of the press racks. The rods are in turn supported upon two spaced apart press plates or platens 18 and 20.

Figure 10:
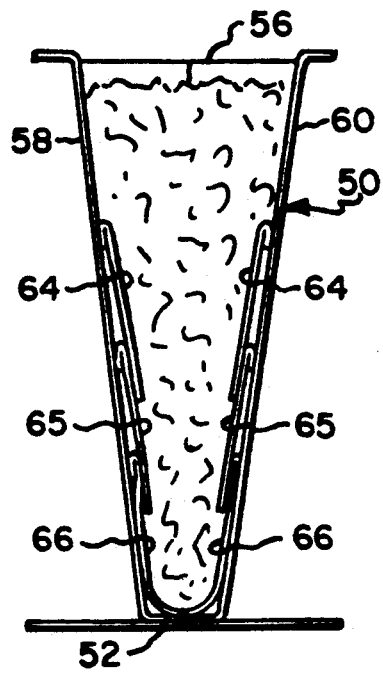
FIGS. 10 through 15 are schematic views illustrating a sequence of operations utilizing the filter bag assembly of this invention.
Figure 13:
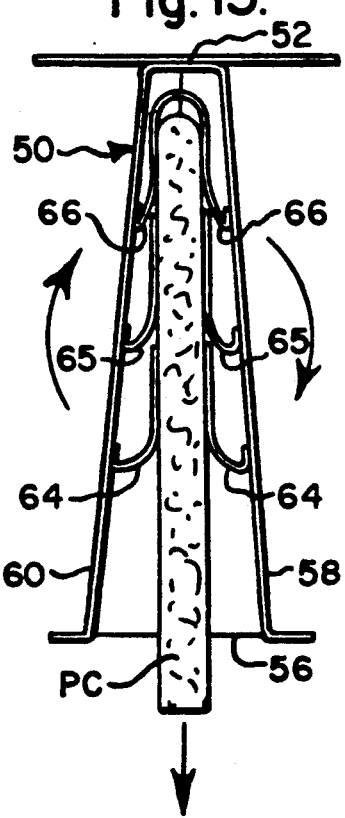
Figure 14:
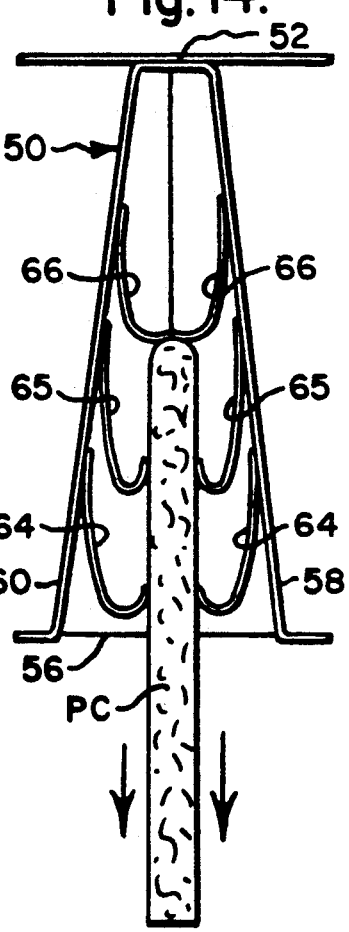

It is a feature of the press shown in the drawings that the racks are supported in such a manner that the bag assemblies, when mounted between adjacent racks, may be moved between an upright position, such as that shown in FIGS. 1 and 10, and an upside down position, such as that shown in FIGS. 13 and 14. To this end shafts 22, 24, are rigidly secured to platens 18, 20, respectively, the shafts 22 and 24, which are in concentric alignment with each other, being journalled within bearing blocks 26, 28, respectively, the bearing blocks being mounted on the press frame F. It should be obvious that if the shafts were to be rotated in either direction of the arrow 30 that there would be corresponding rotation of the platens 18 and 20 and racks 14 about the axis of the shafts. To this end drive means 32 is provided for engaging the shaft 24, the drive means including an output shaft 34 which is coupled to the shaft 24 by means of a coupling 36. As the drive means 32 causes the shaft 34 to be rotated in one direction, the press racks 14 will be moved from an upright position, such as that shown in FIGS. 1 and 10, to an inverted or upside down position, such as that shown in FIGS. 13 and 14. Rotation of the shaft 34 in the other direction will restore the platens 18 and 20, as well at the racks 14, from their upside down position to the upright position shown in FIG. 1.

Not only are the racks 14 mounted for rotational movement, but they but they may also be moved towards and away from each other. Thus, as shown in FIG. 1 the lefthand end of each of the rods 16 is welded (as at 16.1) to the associated press platen 20. The righthand end of each of the rods 16 is supported within right-hand platen 18 by a bearing 38 for sliding movement. To this end, a stainless steel cylindrical sleeve or hub 40 is welded or otherwise rigidly secured to the outermost surface of the platen 18, (also made of stainless steel). The bearing 38 is held or trapped within the hub 40 by an apertured retainer 42, the hub being in alignment with the associated aperture in the platen through which the rod 16 passed, which retainer is in turn secured to the hub 40 by bolts 44 received within suitable apertures within the hub 40. As can be seen from FIG. 2a the apertures in the platen 18 and retainer 42 are of a smaller diameter than the external diameter of bearing 38. While not shown, means are provided for moving the platen 18 towards the platen 20 in the direction of the arrow 46, the platen 20 being supported in such a manner that it will not shift laterally to the left or to the right as shown in FIG. 1. Thus, by moving the platen 18 in the direction of the arrow 46 the press racks can be moved towards each other. Also, the same mechanism which is utilized to move the press platen 18 in the direction of the arrow 46 can also be utilized to move the platen 18 in the reverse direction. The means to move the platen 18 towards and away from the other platen 20 can be any suitable mechanism, such as hydraulic cylinder assemblies secured to a portion of the frame F which supports the bearing blocks 26 and 28, the other end of the hydraulic cylinder assemblies being connected to a structure which may abut the right-hand side of the movable frame platen 18 in such a manner that the platen is relatively free to rotate with the shaft 22.

Figure 6:
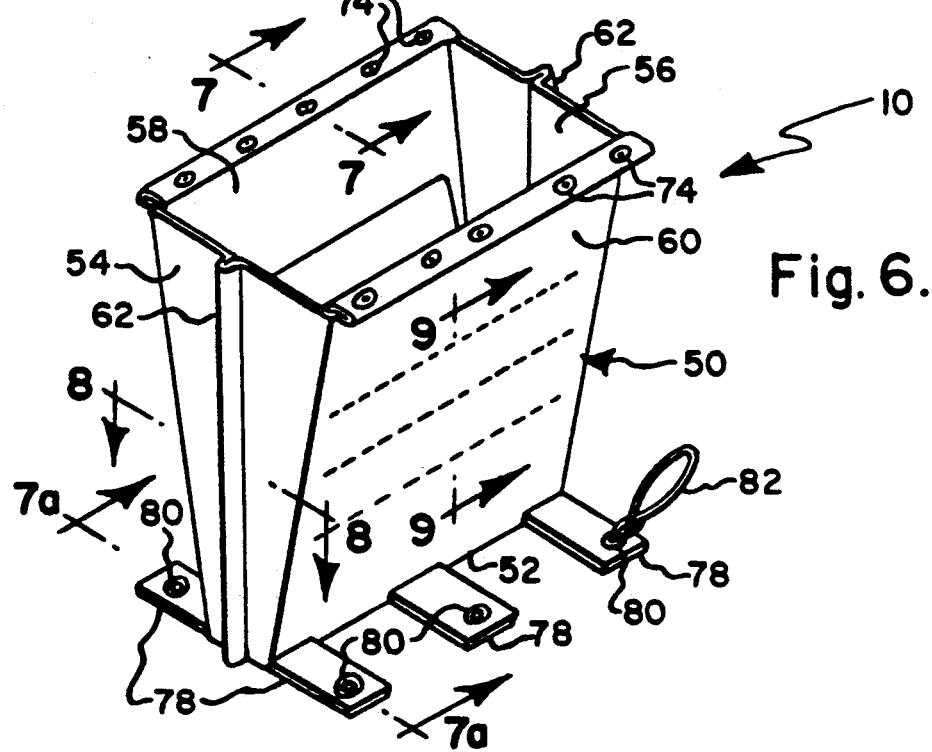
FIG. 6 is a perspective view of the novel filter bag assembly of this invention, the bag assembly being shown in the position it would have when mounted in the press assembly before a pressing operation is initiated.

With reference now to the filter bag assembly 10, the filter bag assembly is formed principally from a bag, indicated generally at 50 in FIG. 6. The bag has a closed bottom portion 52, and four sides, the four sides including a pair of narrow opposed sides 54 and 56, and a pair of opposed wide sides 58, 60. As can be seen, the upper edges of the sides 54, 56, 58 and 60 define an open top when the bag is in its normal upright contents receiving position. In practice the bottom 52 and the four side 54, 56, 58 and 60 are made from a single unitary piece of a porous material, such as a filter cloth. Thus, the material is suitably cut, and side edges are sewn together along a seam 62 as best shown in FIGS. 6 and 8.

Figure 15:
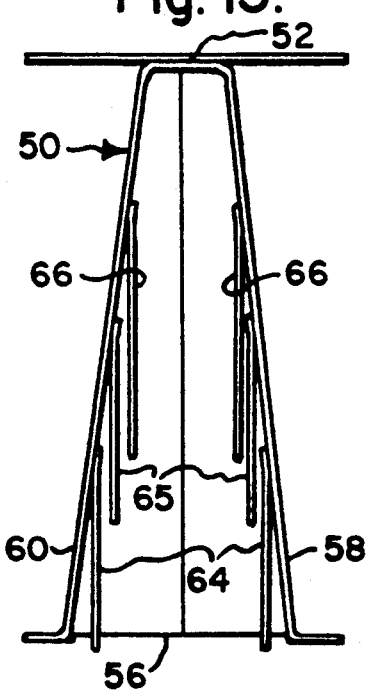

In accordance with this invention the bag is provided with an inner liner made of a filter material, the inner liner preferably being a plurality of flaps. Thus, three flaps are provided on each wide side of the bag in the preferred embodiment, there being an upper flap 64, (FIG. 9), an intermediate flap 65, and a lower or bottom flap 66. It can be seen that when the bag is in its normal upright position that the flaps are arranged in tiers, with the lower edge of one flap overlying the top edge of another. Thus, as can be seen, the lower edge of flap 64 overlies the top edge of flap 65. Similarly, the lower edge of flap 65 overlies the top edge of flap 66. The flaps are secured at their top edges, preferably by sewing, to the inner surface of the associated wide side of the bag 50. As can be seen, the upper edge of each of the flaps may be folded over before it is sewn to the material of the associated wide side 58 or 60. It should be noted that the lower edges of the flaps are not secured to the bag in any manner. This will permit the flaps, when the bag is inverted, to assume a hanging position as best shown in FIG. 15. It can also be seen that the top edge of the top flap in the preferred embodiment is spaced below the top edge of the side of the bag to which it is secured so that when the bag assembly 10 is inverted and the bottom of the bag 50 is held from falling, the lower edge of the top flap 64 will not extend an appreciable distance below the top edge of the bag. This construction is preferred so that when the bag is moved back to its normal upright position the flaps will fall back into the bag without draping over the upper edges of the sides of the bag and thus further reducing the attention required from an operator.

In accordance with one of the features of this invention the bag 50 and, the inner liner (or flaps) may be made of differing filter materials. Thus, the bag may be made of a strong filter material capable of withstanding tension forces applied to the bag when the press is opened as well as during pressing. Similarly, the flaps may be made of a differing material, such as a filter cloth capable of filtering out relatively fine particles. In any event, the flaps are made of a suitable filter material. The particular filter material will be selected for the materials being pressed as is well known in the art.

In order to mount the bag assembly the press first mounting means are carried by the top edge 14.1 of each of the press racks, and second mounting means are carried by the top edges of the wide sides 58 and 60 of the bag. As can be seen from FIGS. 1, 3 and 4, the first mounting means are pins 68. These pins have an L-shaped upper end portion 68.1 which extends in the plane of the press rack. In order to prevent the pins 68 from rotating within the press racks, which are preferably made of a plastic material, each of the pins 68 is welded to a bracket 70 which is secured to the top 14.1 of the rack by a screw 72 or the like. The second mounting means are grommets 74. To this end, the upper edge of the wide side 58 (or 60) is folded back upon itself to provide extra material for the grommets to engage, and the grommets are mounted therein. When mounting the filter bag assemblies 10 in the press 12 it is only necessary to pass the pins 68 through the grommets 74 to support the bag assemblies on the press racks.

In order to prevent the bag assemblies 10 from dropping out of the press when it is inverted additional retaining means are provided to retain the bottom of the bags from dropping. These retaining means include first retaining means carried by the bottom edges of the press racks, and second retaining means connected to the bottom of the bags. The first retaining means are a plurality of pins 76 having L-shaped lower ends 76.1, the pins lying in the plane of the rack with all of the pin ends extending towards one side 14.4 of the press rack. The pins 76 are secured to the lower edges 14.3 of the racks in the same manner that pins 68 are secured to the top edges 14.1. The second retaining means include straps 78 which are secured by sewing (or by any other suitable means) to the bottom of the bag, the straps being provided with grommets 80 at their free ends. The straps are preferably made of a strong material which may be doubled over upon itself in order to provide additional material for the grommets to engage. To secure the bottom of the bag to the press rack it is only necessary to pass the pins 76 through the grommets 80.

As it is possible for the lower end of the bag assembly to shift laterally as it is rotated between upright and inverted positions, holding means are provided. These holding means include an elastic strap 82 which is secured at one end to one end of one of the straps as best shown in FIG. 6. The other end of the elastic strap engages receiving means in the associated press rack, the receiving means being in the form of a slot 84 (FIG. 5).

Figure 11:
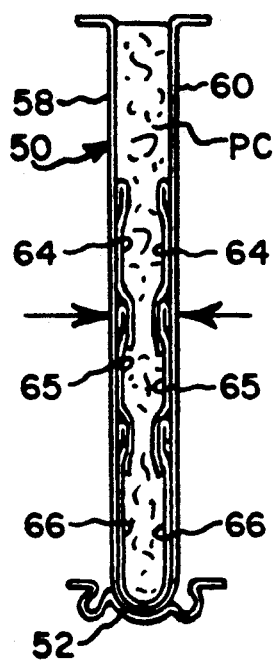
Figure 12:
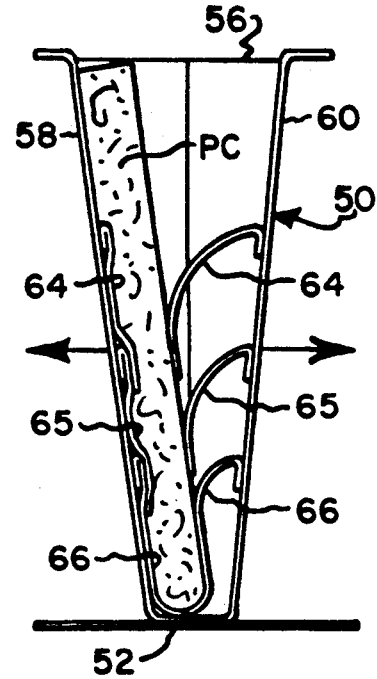

The operation of the filter bag assembly of this invention should be apparent from a consideration of FIGS. 10 through 15. The bag assembly, after it has been properly mounted between two adjacent press racks 14, is initially filled with pulp which is to be pressed, for example, apple pulp. The press racks are then moved toward each other, as platen 18 is moved towards platen 20, to force the wide sides of the bags towards each other, pressing the fruit pulp within the bag, causing juice to be squeezed from the pulp. The completion of this operation is shown in FIG. 11 with the pomace or press cake PC being shown in intimate contact with the flaps 64, 65 and 66. After this operation has been completed, the press racks are moved away from each other causing the bag assemblies to open as shown in FIG. 12. In this connection though, it should be noted that the press rack 14 to the right-hand side, as viewed in FIG. 1, is secured to platen 18. As platen 18 is initially moved away from platen 20, it will, through the right hand rack, pull the right hand bag to its open position. After this bag has been opened, the continued movement of platen 18 to the right will the be transmitted through the top of the bag and through side straps 86, carried by L-shaped pins 88 on the sides of the racks 14, to the next adjacent press rack, causing it to shift in the right hand direction, opening the next bag, and so on. As the bags open, the press cake PC within each bag may tend to stick to one side of the bag as shown in FIG. 12. After all of the bags have been opened, the entire press rack is inverted by rotating the shafts 22, 24, 180°. At the completion of this operation the press cake PC is pulled out of the bag by gravity, and it will peel itself away from the associated liners or flaps, causing these flaps to then assume an inverted position as shown in FIGS. 14 and 15. In order to speed up the operation the racks may be vibrated.

It should be obvious from the above that the objects of this invention have been accomplished in a relatively expedient manner, and that far less operator time will be required when using the filter bag of this invention, as it will not be necessary to manually separate the press cake PC from the filter bag.

While a preferred embodiment has been shown and described above in which the principles of the present invention have been incorporated, it is to be understood that this invention is not to be limited to the particular details shown and described above, but that, in fact, widely differing means may be employed in the practice of the broader aspects of this invention.

What is claimed is:

1. A filter bag assembly which may be used within a press assembly; the filter bag assembly comprising:
   a bag having when assembled a closed bottom and four sides, each side having an upper edge, the sides including two opposed narrow sides and two opposed wide sides, each side being made of a porous material, the upper edges of the sides defining an open top when the bag is in its normal upright contents receiving position;

wherein the improvement comprises providing opposed flaps made of a filter material, each flap having upper and lower edges, the flaps being secured only at their upper edges to the insides of the two wide sides, the flaps extending towards the bottom of the bag.

2. The filter bag assembly as set forth in claim 1 wherein there are at least two flaps on each of the wide sides, the flaps on each side being arranged in tiers with the lower edge of one flap overlying the top edge of an adjacent flap on the same side.

3. The filter bag assembly as set forth in claim 2 wherein the upper edge of the top flap on each side is spaced below the top edge of the side of the bag to which it is secured so that, when the bag is inverted and the bottom of the bag is held from falling, the lower edge of the top flaps extend only a short distance below the top edge of the bag, whereby, when the bag is moved back to its normal upright position, the flaps will fall back into the bag without draping over the upper edges of the sides.

4. The filter bag assembly as set forth in claim 1 wherein the wide sides of the bag and the flaps are made of differing materials.

5. The filter bag assembly as set forth in claim 1 wherein all the sides of the bag and the bottom of the bag are made from a single unitary piece of porous cloth.

6. The filter bag assembly as set forth in claim 5 wherein the wide sides of the bag and the flaps are made of differing materials, the sides and bottom of the bag being made from a strong material which is capable of withstanding relatively high tension forces, and the flaps being made of a filter cloth which is capable of filtering out relatively fine particles.

7. The filter bag assembly as set forth in claim 1 wherein the bag assembly further includes retaining means secured to the bottom of the bag.

8. The filter bag assembly as set forth in claim 7 wherein the retaining means are straps secured to the bottom of the bag, the straps extending in a direction generally parallel to the narrow sides of the bags.

9. The filter bag assembly as set forth in claim 1 wherein the bag assembly further includes mounting means secured to the top edges of the wide sides of the bag for securing the top edges of the bag to a press assembly.

10. The filter bag assembly as set forth in claim 9 wherein the mounting means are gromets.

11. A filter bag assembly in combination with a press assembly; the combination comprising:

a press including spaced apart vertical press racks, each of the press racks having top and bottom edges, the racks being mounted for movement towards and away from each other and also being mounted for movement from a normal upright position to an inverted position so that the top edge may be moved from the top position to a bottom position, first mounting means carried by the top edge of each of the press racks when the press racks are in their normal upright positions; and a filter bag assembly including a bag when assembled having a closed bottom and two opposed wide sides made of a porous material, each side having upper edges, the upper edges defining an open top when the bag is in its normal upright contents receiving position, opposed flaps made of a filter material, the flaps having upper and lower edges, the flaps being secured at their upper edges to the insides of the two wide sides, the flaps extending towards the bottom of the bag when the bag is in its normal upright contents receiving position, and second mounting means secured to the top edges of the wide sides of the bag for securing the top edges of the bag to the first mounting means carried by the top edges of the press racks.

12. The combination as set forth in claim 11 wherein the first mounting means are pins carried by the top edges of the press racks, and wherein the second mounting means are gommets carried by the top edges of the wide sides of the bag.

13. The combination as set forth in claim 12 wherein the pins are L-shaped.

14. The combination as set forth in claim 11 wherein the bag is made from a single piece of filter cloth, and wherein the upper edges of the wide sides of the bag are folded back upon themselves to provide extra material for the grommets to engage.

15. The combination as set forth claim 11 further comprising first retaining means carried by the bottom edges of the press racks, and wherein second retaining means are connected to the bottom of the bag, the first and second retaining means engaging each other to prevent the bottom of the bag from falling down when the press racks are moved from their normal upright position to their inverted position.

16. The combination as set forth in claim 15 wherein the first retaining means at the bottom of the racks are pins, and wherein the second retaining means are straps provided with grommets at their ends, all the pins having first and second ends, the first ends being secured to the bottom edges of the press racks, and the second ends being free.

17. The combination as set forth in claim 16 wherein the first retaining means are L-shaped pins.

18. The combination as set forth in claim 17 wherein the L-shaped pins lie in a vertical plane, all of the free pin ends extending towards one side of the associated press rack, and the other side of the associated press rack being provided with receiving means, and wherein the second retaining means further include elongaged holding means secured at one end to one of the straps, the other end of the elongated holding means being capable of being received by the receiving means whereby the bag assembly is prevented from lateral shifting to prevent accidental release when the press racks are rotated.

19. The combination as set forth in claim 18 wherein the elongated holding means is an elastic strap, and wherein the receiving means is a slot formed in said other side of the rack.

* * * * *